US 6,565,153 B2

(12) United States Patent
Hensel et al.

(10) Patent No.: US 6,565,153 B2
(45) Date of Patent: May 20, 2003

(54) UPPER BACK SUPPORT FOR A SEAT (75) Inventors: David M. Hensel, Canton, MI (US); Jeffery A. DeBoer, Ann Arbor, MI (US)

(73) Assignee: Johnson Controls Technology Corporation, Plymouth, MI (US)

( * ) Notice: Subject to any disclaimer, the term of this patent is extended or adjusted under 35 U.S.C. 154(b) by 0 days.

(21) Appl. No.: 09/918,946

(22) Filed: Jul. 31, 2001

(65) Prior Publication Data

US 2003/0025370 A1 Feb. 6, 2003

(51) Int. Cl.$^7$ ................................................. A47C 3/00
(52) U.S. Cl. ............... 297/285; 297/301.1; 297/452.14; 297/452.54
(58) Field of Search ............................... 297/285, 301.1, 297/354.11, 452.14, 452.15, 452.29, 452.31, 284.4, 452.54, 354.1

(56) References Cited

U.S. PATENT DOCUMENTS

| | | | |
|---|---|---|---|
| 3,627,379 A | * 12/1971 | Faust | 297/284.4 |
| 3,861,747 A | * 1/1975 | Diamond | 297/452.14 |
| 4,099,774 A | * 7/1978 | Sandham | 297/298 |
| 4,564,235 A | 1/1986 | Hatsutta et al. | 297/284 |
| 4,711,497 A | * 12/1987 | Kazaoka et al. | 297/452.54 |
| 4,805,962 A | * 2/1989 | Sacco et al. | 297/218.1 |
| 5,026,116 A | 6/1991 | Monte | 297/284 |
| 5,101,811 A | * 4/1992 | Brunswick | 297/284.4 |
| 5,330,254 A | * 7/1994 | Larson | 297/338 |
| 5,385,388 A | * 1/1995 | Faiks et al. | 297/301.3 |
| 5,411,317 A | 5/1995 | Faust et al. | 297/452.3 |
| 5,452,868 A | 9/1995 | Kanigowski | 244/122 |
| 5,505,520 A | 4/1996 | Frusti et al. | 297/284.4 |
| 5,558,399 A | 9/1996 | Serber | 297/284.4 |
| 5,577,811 A | 11/1996 | Ogg | 297/452.15 |
| 5,664,841 A | * 9/1997 | Dal Monte | 297/408 |
| 5,772,281 A | 6/1998 | Massara | 297/284.4 |
| 5,836,647 A | * 11/1998 | Turman | 297/216.1 |
| 5,967,608 A | * 10/1999 | Van Sickle | 297/284.6 |
| 5,975,632 A | * 11/1999 | Ginat | 297/284.7 |
| 5,975,634 A | 11/1999 | Knoblock et al. | 297/300.4 |
| 6,082,823 A | 7/2000 | Aumont et al. | 297/452.2 |
| 6,092,871 A | * 7/2000 | Beaulieu | 297/284.4 |
| 6,116,695 A | * 9/2000 | Heidmann et al. | 297/285 |
| 6,257,665 B1 | * 7/2001 | Nagamitsu et al. | 297/285 |
| 6,419,318 B1 | * 7/2002 | Albright | 297/284.7 |

FOREIGN PATENT DOCUMENTS

| | | | | |
|---|---|---|---|---|
| DE | 2651 843 A1 | | 11/1976 | |
| DE | 4233627 A1 | * | 4/1994 | ............ A47C/7/46 |
| EP | 0 552 904 A1 | | 1/1993 | |
| GB | 1070298 A4 | * | 10/1964 | ............ A47C/7/12 |
| GB | 2165445 A | * | 4/1986 | ............ A47C/1/00 |
| GB | 2196530 A | * | 5/1988 | ............ A47C/7/46 |
| WO | WO 94/08491 | | 4/1994 | |

* cited by examiner

Primary Examiner—Peter M. Cuomo
Assistant Examiner—Stephen D'Adamo
(74) Attorney, Agent, or Firm—Foley & Lardner (57) ABSTRACT

An upper back support in a vehicle seat, with the vehicle seat having a base assembly including a seat support. The seat member is supported on the base assembly and a back frame is pivoted to the base assembly for movement. A back shell is connected to the back frame and an upper back support is coupled to the back shell. The upper back support comprises a panel having a lower portion and an upper portion, with the lower portion flexibly coupled to the back shell of the vehicle seat. A resilient member is coupled to the panel proximate the upper portion and to the back shell of the vehicle seat. An additional resilient member can be coupled to the panel proximate the upper portion and to the back shell of the vehicle seat in a spaced apart relationship to the other resilient member.

20 Claims, 6 Drawing Sheets

UPPER BACK SUPPORT FOR A SEAT

FIELD OF THE INVENTION

The present invention relates generally to the art of seating and more particularly to an upper back support in a seat.

BACKGROUND OF THE INVENTION

A wide variety of comfort controlled vehicle seating systems are well-known and currently in use. Simple systems provide fore and aft adjustability and reclining of the seat back. More sophisticated seating systems add manual or power lumbar supports, vertically adjustable headrests, height and tilt controls for the seat cushion, and the like. Many of the current seats are designed and modeled for a mannequin named "OSCAR" in the industry and more specifically to the movement of OSCAR about a hip joint center.

Researchers at Michigan State University in the early 1990's began to look more carefully at actual movements of the body in an automotive vehicle setting and came up with a new model—"JOHN" named after the research sponsor, Johnson Controls, Inc.—and developed relationships between thorax and pelvic movement and the impact on lumbar curvature.

These researchers determined that there is a relationship between these two movements and that a desired curvature for the lumbar area could be created if the thorax area is moved significantly. Instead of having a lumbar support push the lumbar vertebrae forwardly (mechanical, pneumatic, manual, powered, etc.), they found that the thorax area moves in a counter rotation with respect to the pelvis. When the thorax moves forward in this model, the shoulders actually move rearwardly. This work led to the prediction that seat comfort could be enhanced if the thorax could be supported in all positions from the equivalent of JOHN being slumped forwardly on a stool to a position in which JOHN is sitting erect, with a total lumbar curvature of about 50°.

Despite this theoretical explanation of seating comfort, developments in the 1990's continued to focus on lumbar support and lumbar height, and several vehicles currently being sold include lumbar supports that go up and down as well as in and out. While seeming to provide some comfort enhancement for vehicle seating occupants, such products ignore the research findings that comfort can, in fact, be enhanced if thorax support is also provided.

As background, it is well recognized that static seats or those employing baskets, paddles and bladder systems can be used for lumbar support. The latter are all variations on a single principle. Each forces the lumbar region into a lordotic or concave shape with the intent of creating a more erect posture and hence greater comfort. Lumbar paddles and baskets can be manually operated or powered. Lumbar bladders are filled with air using a manual pump or an electrically powered pump to increase the bladder's volume and the amount of prominence into the back.

Two additional static seats which discuss comfort are known to the present inventors. A so-called "iliac" seat has a contour in the pelvic region and an extreme amount of contour in the location of the iliac crests of the pelvis. Their purpose is to support the pelvis and avoid hyperflexion of the lower lumbar joints to eliminate the probability of pain. The second is called a New Generation Ergonomic Seat which features a lumbar support and a seat contour which is designed to provide support from the pelvis (sacrum) to the $10^{th}$ thoracic vertebrae (located at the bottom of the thorax). This seat simulates a position the body would assume if lying in a bed, a so-called "neutral" position with less curvature than would be encountered if the person was standing erect.

Yet a further seat maneuvering system includes a cushion, a lower back support and an upper back support, the latter two being pivotally coupled in the mid-back region. The cushion moves on a pair of rollers in an arc relationship to the mid-back pivot. While the main object of the seat is safety (i.e., anti-submarining), increased comfort is attributed to the seat by the inventor.

Another seat has pelvis, lumbar and thoracic support, but movement of them is controlled solely by movement of the lumbar support. The other two are connected to it, the thoracic support being pivotally connected to the top of the seat back frame. This allows the shoulders to recline and the lower part of the thorax to be supported.

A biomechanically articulating chair has been devised and was built around the movements of the "2D JOHN" model. Allegedly it provides improved postural support by supporting the pelvis, thorax, and the lumbar region. The seat articulates as if "JOHN" pivots on the ischial tuberosites. The pelvis support pivots just under the ischial tuberosites of the occupant, while the thorax support pivots in the mid-back. The chair is intended to support the occupant through a wide range of spinal curvature and torso recline angles, thereby maintaining geometric compatibility between the height of the occupant and the seat contour to eliminate undesirable pressure distributions on the occupant. This chair is known for use in the office furniture or home fields and is not specifically illustrated for use with motor vehicle seating.

While several of the above-mentioned seat constructions can enhance occupant comfort, the present inventors believe a substantial improvement over all of them can be provided. Such improvement would be considered an important advance in this art.

SUMMARY OF THE INVENTION

A primary feature of the present invention is to overcome the above-noted disadvantages of prior art seating systems by providing a seat that more closely follows the way a seated person moves and uniformly supports the upper back or thorax, thus providing a wider range of seated positions that are available in any currently known seating.

The present invention provides a seat comprising a base assembly including a seat support. A seat member is supported on the base assembly with a back frame pivoted to the base assembly or any suitable mounting structure within the seat assembly for movement. A back shell is connected to the back frame and an upper back support is coupled to the back shell. The upper back support comprises a panel having a lower portion and an upper portion, with the lower portion flexibly coupled to the back shell of the seat. A resilient member is coupled to the panel proximate the upper portion and to the back shell of the seat. Additional resilient members can be coupled to the panel in a spaced apart relationship to the other resilient member. Another embodiment of the seat includes a headrest coupled to the upper portion of the panel and a support frame assembly coupled to the headrest and the back frame of the seat.

The present invention also provides an upper back support in a vehicle seat, with the vehicle seat having a base assembly including a seat support. The seat member is supported on the base assembly and a back frame is pivoted to the base assembly or any suitable mounting structure within the seat assembly for movement. A back shell is connected to the back frame and an upper back support is coupled to the back shell. The upper back support comprises a panel having a lower portion and an upper portion, with the lower portion flexibly coupled to the back shell of the vehicle seat. A resilient member is coupled to the panel proximate the upper portion and to the back shell of the vehicle seat. An additional resilient member can be coupled to the panel proximate the upper portion and to the back shell of the vehicle seat in a spaced apart relationship to the other resilient member. Another embodiment of the upper back support includes a headrest coupled to the upper portion of the panel and a support frame assembly coupled to the headrest and the back frame of the vehicle seat.

The present invention further provides an upper back support for an occupant of the seat with the seat having a base assembly including a seat support and a seat member supported on the base assembly. A back frame is pivoted to the base assembly or any suitable mounting structure within the seat assembly for movement and a back shell is connected to the back frame. The upper back support comprises a means for supporting having a lower portion and an upper portion, a means for coupling attached to the lower portion of the means for supporting and attaching to the back shell of the seat. A means for biasing is coupled to the means for supporting proximate the upper portion and to the back shell of the seat. Another embodiment of the upper back support includes a means for resting the head of the occupant coupled to the upper portion of the means for supporting and a means for holding coupled to the means for resting and the back frame of the vehicle seat.

The present invention further provides a method of assembly of a seat having an upper back support, with the seat having a base assembly including a seat support and a seat member supported on the base assembly. A back frame pivoted to the base assembly or any suitable mounting structure within the seat assembly for movement and a back shell connected to the back frame with an upper back support flexibly coupled to the back shell. The method comprises the steps of providing a panel having a lower portion and an upper portion and providing a flexible coupler having a first end and a second end. Then attaching the first end of the flexible coupler to the lower portion of the panel and attaching the second end of the flexible coupler to the back shell. Then providing a resilient member having a first end and a second end and inserting the resilient member between the panel and the back shell. Attaching the first end of the resilient member to the panel proximate the upper portion of the panel and attaching the second end of the resilient member to the back shell. Another embodiment of the method includes the step of providing a second resilient member having a first end and a second end and inserting the second resilient member between the panel and the back shell in a spaced apart relationship from the other resilient member and attaching the first end of the second resilient member to the panel proximate the upper portion of the panel and attaching the second end of the second resilient member to the back shell. Another embodiment of the method includes the steps of providing a headrest and attaching the headrest to the panel. It also includes providing a support frame assembly and attaching the support frame assembly to the back frame of the seat and aligning the assembly with the headrest.

DETAILED DESCRIPTION OF THE PREFERRED EMBODIMENTS

Before beginning the detailed description of an exemplary embodiment, several general comments are warranted about the applicability and the scope of the present invention.

First, the illustrations relate to a seat (also can be referred to as a chair) particularly adapted for motor vehicles, such as cars, SUVs, vans, trucks, buses and the like, but the invention is applicable also to seating used in homes, offices, aircraft, nautical vehicles or other environments.

Second, the seat of the present invention is illustrated in the first few Figures as a padded seat having certain contours, trim and the like. While this configuration is presently preferred, a wide variety of seat configurations and appearances will benefit from use of the mechanical support and movement mechanisms described in connection with the later Figures. Also the exterior of the seat can be covered by fabric, vinyl, leather or other materials known and used in the seating art.

Third, with regard to the seat described later herein, substantial modifications can be made without departing from the invention's intended scope. For example, while certain mechanical systems are described to move seat components to achieve certain results, other mechanisms, manual or powered could be substituted therefore. For example, where a screw drive is used in moving the thorax pivot location, other mechanical equivalents including, but not limited to, four bar linkages, air or hydraulic cylinders, air bladders, rack and pinion systems, cams and cables, gears, etc. could be employed. Another example is that for a pelvis support, i.e., a pair of clam-shell like devices (which are themselves already known in the art). They could be replaced by other known or subsequently developed support mechanisms. These mechanisms do not, in and of themselves, form part of the present invention, but when combined with the other pivot, support, rotation and moving mechanisms define the invention and result in more comfortable seating for the occupant.

Referring now to the FIGS. 1 through 8, FIG. 1 illustrates an exemplary embodiment of a vehicle seat or chair 10 which includes an upper back support 30. The chair 10 generally comprises a base assembly 20 including a seat support 22 with a seat member 26 supported on the base assembly 20. A back frame 24 pivoted to the base assembly 20 for movement has a back shell 28 connected to the back frame 24 and an upper back support 30. The back frame 24 can be coupled to a suitable mounting structure within the seat assembly other than the base assembly 20 for movement.

Figure 1:
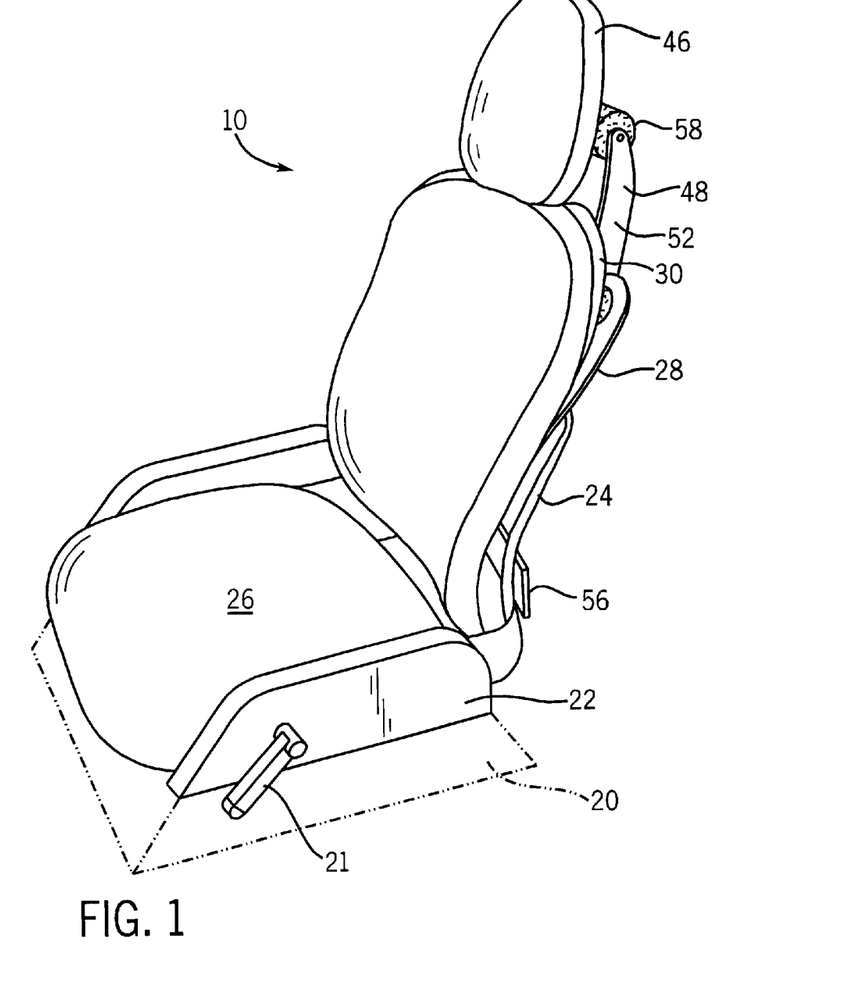
FIG. 1 is a perspective illustration of a vehicle seat having an exemplary embodiment of an upper back support.

The back frame 24 and the back shell 28 form a compliant back support for a seated user that is particularly comfortable and sympathetic to back movement of the seated user, particularly in the lumbar area of the back. Adjustment features such as a control lever 21 or various buttons or switches on the base assembly 20 or seat support 22 provide further comfort and allow a seated user to customize the chair 10 to meet his/her particular needs and preferences in the upright or reclined positions.

The word "compliant" is used herein as intended to refer to the flexibility of the present back especially in the lumbar area or a back structure that provides the equivalent of that flexibility, and the present back shell system is compliant and designed to work sympathetically with the human back. The word "sympathetically" is intended to mean that the back moves in close harmony with a seated user's back and posturally supports the seated user's back as the chair back is reclined and when a seated user flexes his/her lower back. The back shell 28 has three specific regions, as does the human back, those being the thoracic region, the lumbar region and the pelvic region. It is to the thoracic region that the present upper back support is coupled.

It should be understood that the back frame 24 may include different back frame shapes. For example, an inverted U-shaped back frame can be replaced with an inverted T-shaped back frame. Coupled to the back frame 24 is the back shell 28 which can be a semi-rigid resiliently-flexible material, for example, plastic, to posturally flexibly support and permit torsional flexing of a seated user's torso when in the chair. The panel 32 can be composed of similar material to provide additional posturally flexible support for the upper torso of a user in the chair.

Figure 2:
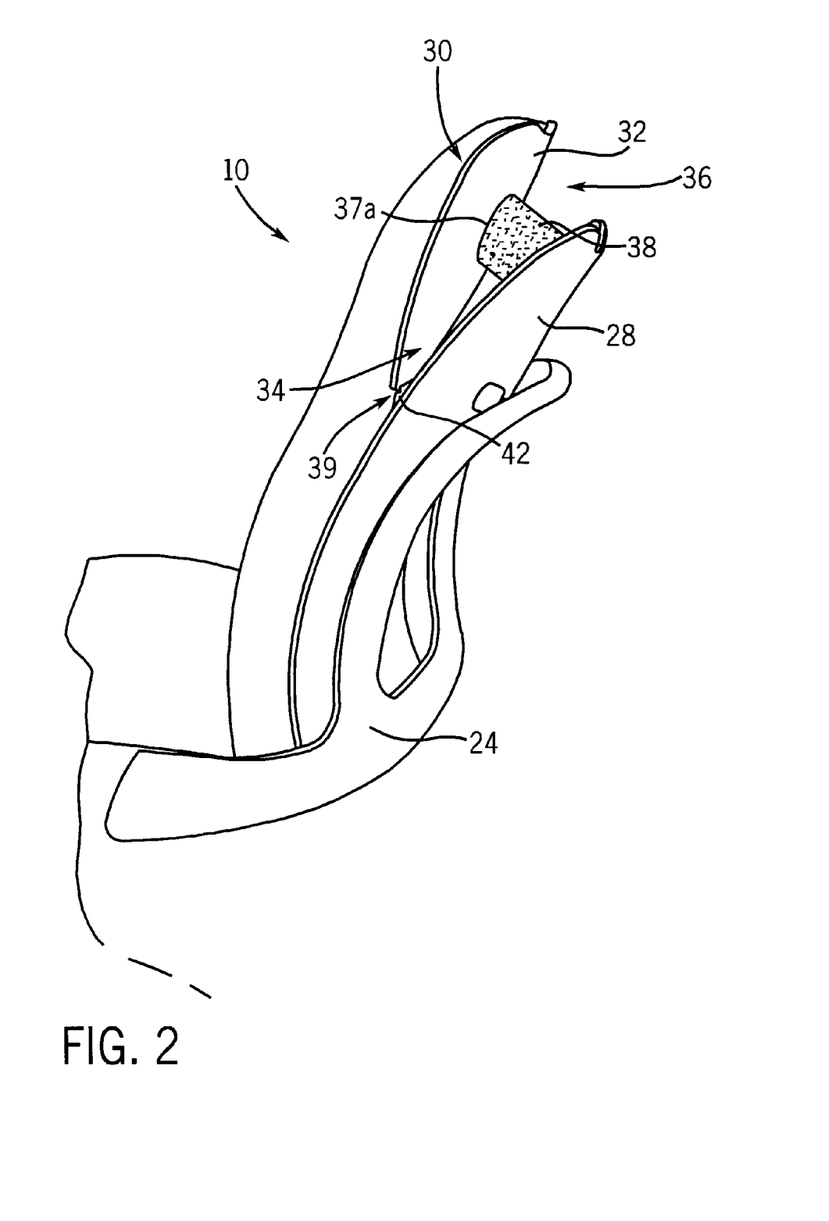
FIG. 2 is a partial side view of a chair with an exemplary embodiment of an upper back support coupled to the back shell of the chair.
Figure 3:
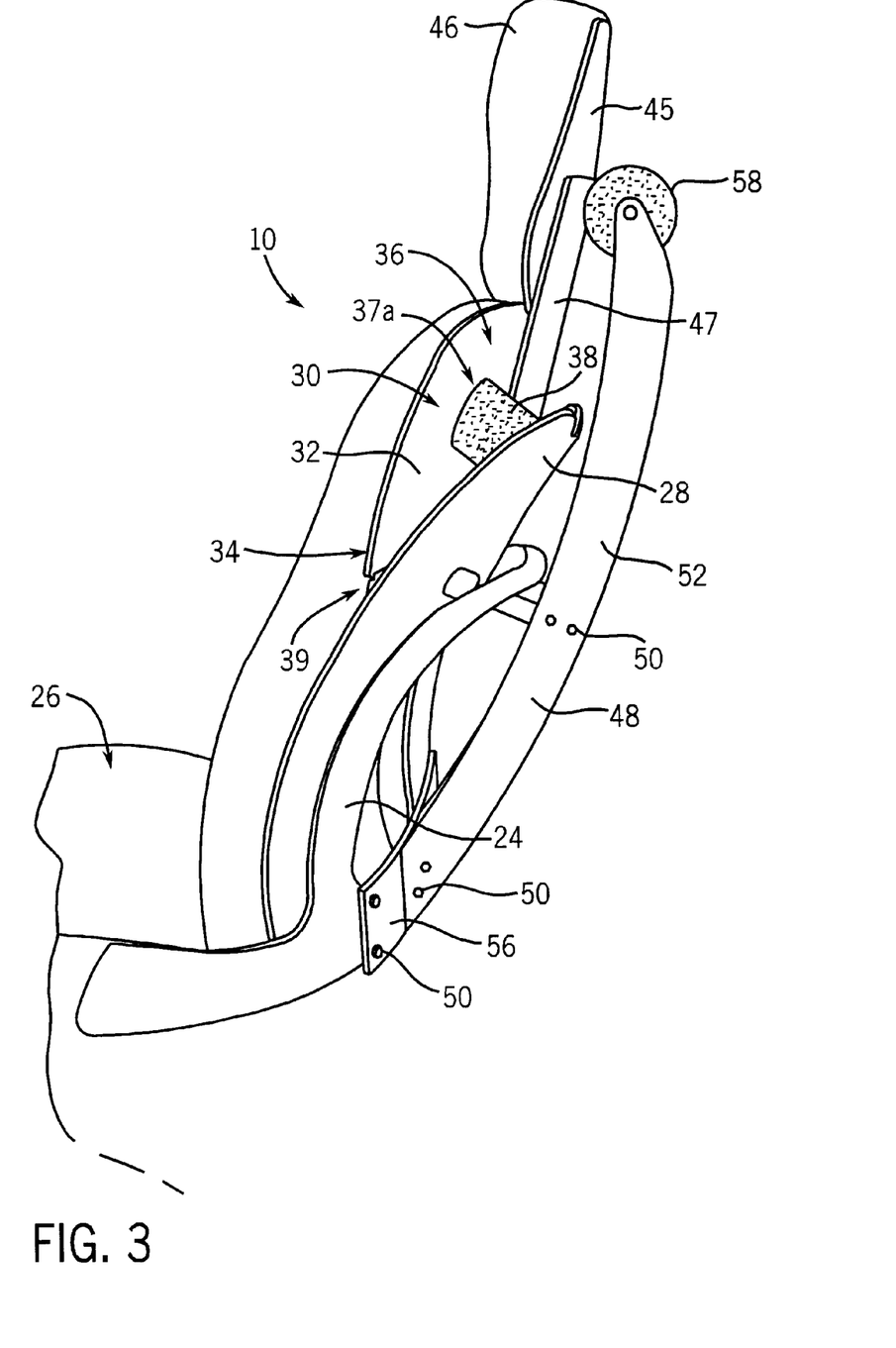
FIG. 3 is a partial side view of a chair with an exemplary embodiment of an upper back support coupled to the back shell of the chair and with the chair having a head rest and support frame assembly.
Figure 8:
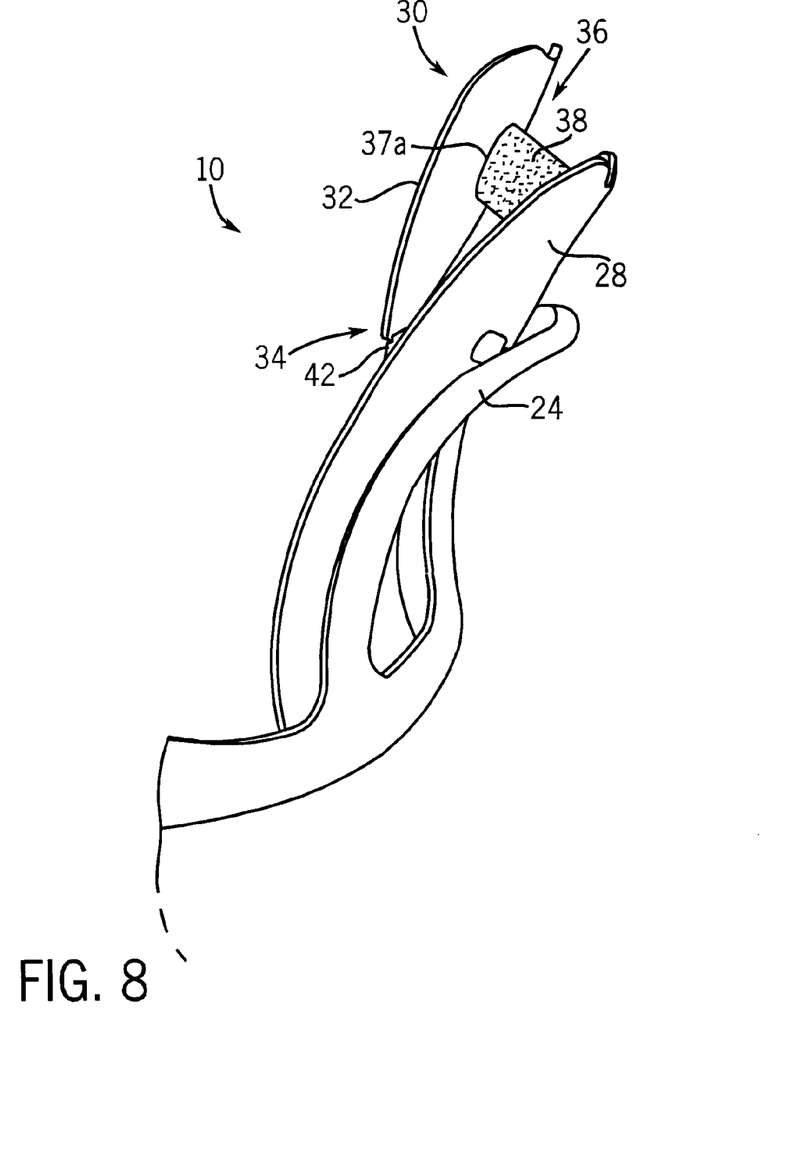
FIG. 8 is a partial, side view of an upper back support coupled the back shell of a seat.

The back frame 24 is curvilinearly shaped and forms an arch across the back area of the chair 10 (See FIGS. 2, 3 and 8). A variety of constructions are contemplated for the back frame 24 and accordingly, the exemplary embodiment should not be improperly limited to only a particular one. For example, the back frame 24 could be entirely metal, plastic or a combination thereof. Also, a rigid internal reinforcement in the back frame 24 could be a tubular, angular iron, or stamping member. The illustrated back frame 24 includes the looping or arch shaped metal reinforcement and an outer molded-on polymeric skin or covering.

Referring to FIG. 2, an upper back support 30 comprising a panel 32 having a lower portion 34 and an upper portion 36 is coupled to the chair 10. The lower portion 34 of the panel 32 is flexibly coupled to the back shell 28 of the chair 10 and a resilient member 38 is coupled to the panel 32 proximate the upper portion 36 and to the back shell 28 of the chair 10.

Figure 4:
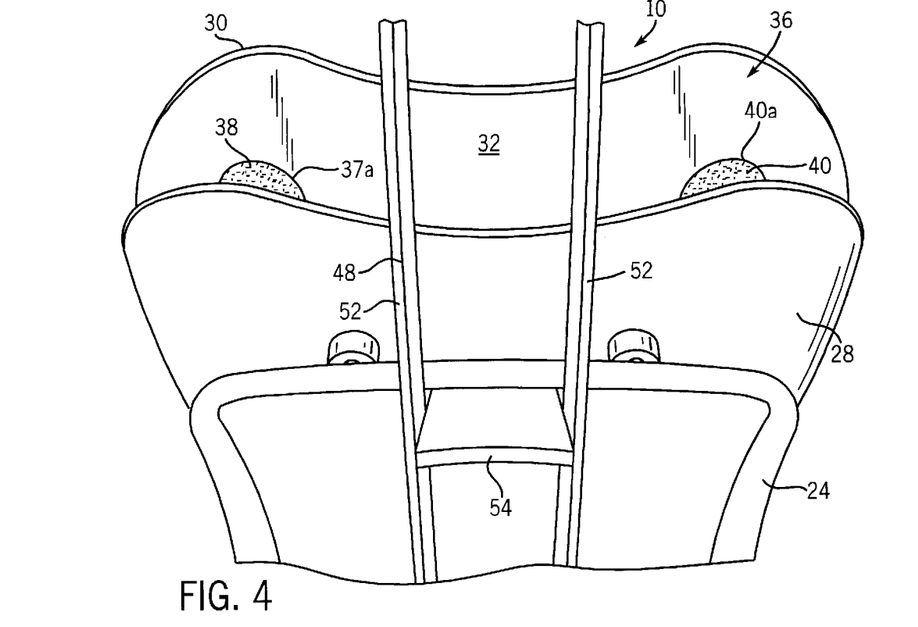
FIG. 4 is a partial illustration of the backside of the chair illustrated in FIG. 3 (cushions not shown) and showing an exemplary embodiment of an upper back support coupled to the back shell of the chair with two resilient members coupled to the panel of the upper back supports.
Figure 6:
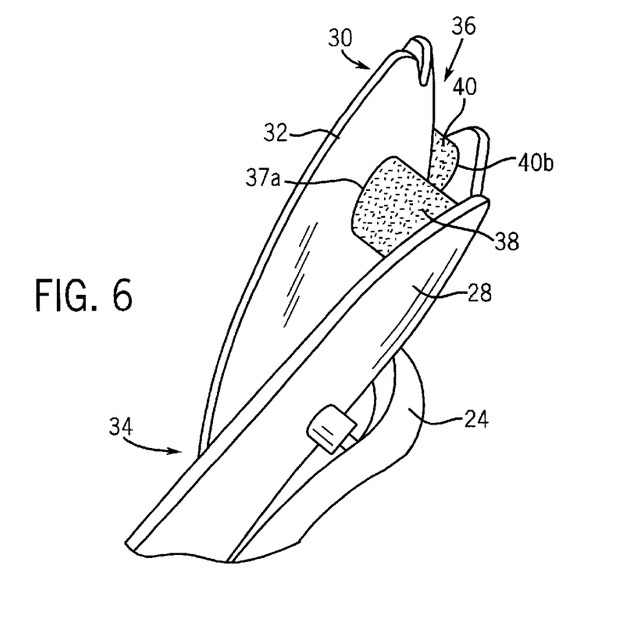
FIG. 6 is a partial, perspective side view illustration of an exemplary embodiment of a panel of an upper back support.
Figure 7:
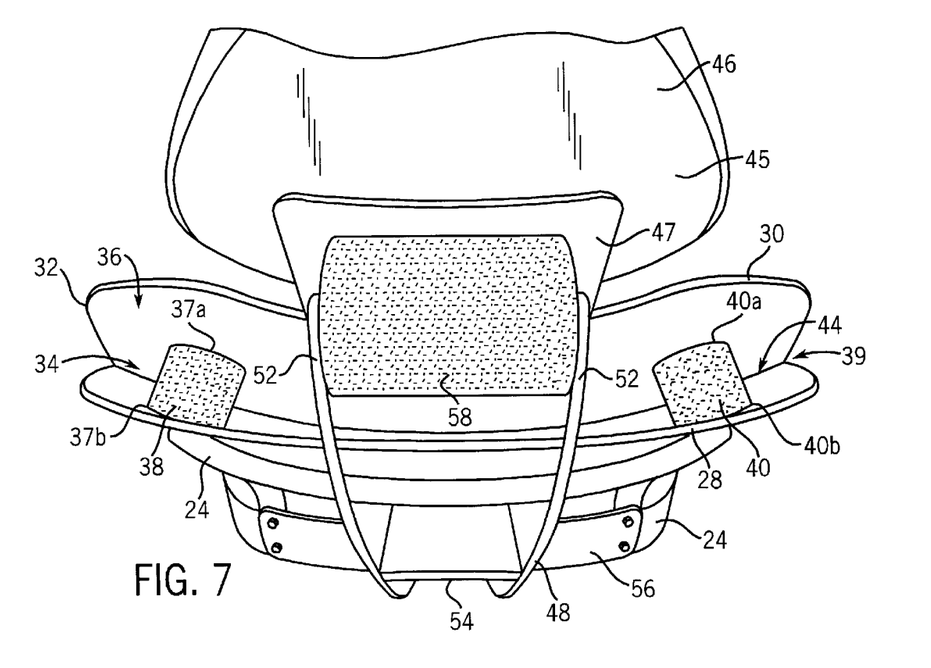
FIG. 7 is a partial, perspective illustration, from an elevated perspective, of the backside of the chair having an exemplary embodiment of an upper back support coupled to the back shell of the chair and the panel of the upper back support coupled to two spaced apart resilient members.

The chair 10 can include an additional resilient member 40 coupled to the panel 32 proximate the upper portion 36 and to the back shell 28 of the chair 10 in a spaced apart relationship to the other resilient member 38 as can best be seen in FIGS. 4, 6 and 7.

Figure 5:
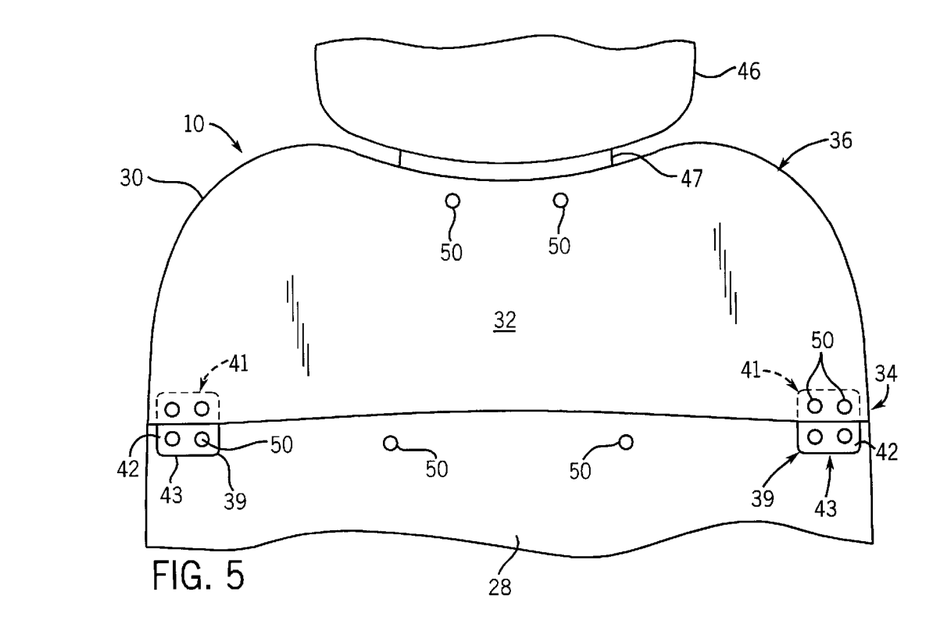
FIG. 5 is a partial illustration of the front side of the chair illustrated in FIG. 3 (cushions not shown) and showing an exemplary embodiment of an upper back support coupled to the back shell of the chair.

Referring to FIG. 5, the resilient members 38, 40 can be composed of one of a foam, rubber and plastic or other suitable materials and combinations of materials. However, it should be understood that other types of resilient members or biasing means can be utilized such as a plastic or metallic coil, or the like. A flexible coupler 39 is used to couple the panel 32 to the back shell 28 of the chair 10. The flexible coupler 39 can be a plastic hinge 42 or an adhesive backed tape 44 (See FIG. 7) or other articulated member which can flexibly couple the panel 32 to the back shell 28. A fastener 50 can be utilized to attach the plastic hinge to the lower portion 34 of the panel 32 and to the back shell 28. Other suitable fastening devices can be incorporated. Also, other devices can be used to attach the panel 32 to the backshell 28, for example, the hinge can be metal, a thread or cable, etc. It is also contemplated that the back shell 28 and the panel 32 may be integrally formed, such as by molding, as a single piece with the lower portion 34 of the panel 32 flexibly coupled to the back shell 28 by a web formed between the panel 32 and the back shell 28.

Another embodiment of the vehicle seat or chair 10, as illustrated in FIGS. 3, 4 and 7 includes a headrest 46 coupled to the upper portion 36 of the panel 32 and a support frame assembly 48 coupled to the headrest 46 and the back frame 24 of the chair 10. The chair 10 can be a vehicle seat as generally illustrated in FIG. 1.

The headrest 46 can include a headrest member 45 and a headrest bridge 47. The headrest member 45 is coupled to the headrest bridge 47 which in turn is coupled to the upper back support 30 as shown in FIG. 3. Fasteners 50 can be used to couple the various parts. Alternatively, the headrest 46 can be coupled to the back shell 28 or to the back frame 24 of the seat.

The support frame assembly 48 can include a pair of longitudinal beams 52 maintained in a spaced apart relationship by an intermediate traverse member 54 and a bottom beam 56. (See FIG. 7). A headrest bumper 58 is coupled between the longitudinal beams 52 and engage the headrest 46 typically on the headrest bridge 47 as shown in FIG. 3. The headrest bumper 58 can be composed of a resilient material similar to the resilient member 38 utilized between the upper back support 30 and the back shell 28. The bottom beam 56 is coupled to the back frame 24 as shown in FIGS. 3 and 7 thereby incorporating the headrest and its support frame assembly into the overall assembly of the vehicle seat or chair 10.

Referring to FIG. 1, a method of assembly of a seat 10 is also provided. The seat 10 has an upper back support 30 and a base assembly 20 including a seat support 22 with a seat member 26 supported on the base assembly 20. A back frame 24 is pivoted to the base assembly 20 for movement, with a back shell 28 connected to the back frame 24. An upper back support 30 is flexibly coupled to the back shell 28 of the seat 10.

Referring to FIG. 5, the method comprises the steps of providing a panel 32 having a lower portion 34 and an upper portion 36 and providing a flexible coupler 39 having a first end 41 and a second end 43 and attaching, the first end 41 of the flexible coupler 39 to the lower portion 34 of the panel 32. Then attaching the second end 43 of the flexible coupler 39 to the back shell 28 of the seat 10.

The flexible coupler 39 can be one of a plastic hinge 42 and an adhesive backed tape 44. The flexible coupler 39 can also be an articulated member.

Referring to FIG. 7, the method also includes providing a resilient member 38 having a first end 37a and a second 37b and inserting the resilient member 38 between the panel 32 and the back shell 28. Then attaching the first end 37a of the resilient member 38 to the panel 32 proximate the upper portion 36 of the panel 32 and attaching the second end 37b of the resilient member 38 to the back shell 28.

An additional second resilient member 40 having a first end 40a and a second end 40b can be inserted between the panel 32 and the back shell 28 in a spaced apart relationship from the other resilient member 38. Then attaching the first end 40a of the second resilient member 40 to the panel 32 proximate the upper portion 36 of the panel 32 and attaching the second end 40b of the second resilient member 40 to the back shell 28. Again the attachment of the second resilient member 40 can be in the same conventional and convenient manner as discussed above.

The attachment of the resilient member 38 can be in any convenient and conventional manner such as use of adhesives or mechanical fasteners such as snaps, rivets or screws.

The method of assembly of the vehicle seat or chair 10 can include providing a headrest 46 and attaching the headrest 46 to the panel 32 and providing a support frame assembly 48 and attaching the support frame assembly 48 to the back frame 24 of the vehicle seat 10 and aligning the assembly 48 with the headrest 46. It should be understood that the order of the several steps described above can be in any convenient and efficient order, which may change from time to time.

Although only a few exemplary embodiments of this invention have been described in detail above, those skilled in the art who review this disclosure will readily appreciate that many modifications are possible in the exemplary embodiments without materially departing from the novel teachings and advantages of the present invention. According to the exemplary embodiments, the elements of the vehicle seat or chair can be made of any suitable materials known to those skilled in the art who may review this disclosure. For example, the back frame can be made of aluminum or plastic, the entire seat assembly can be covered in a leather or fabric material and electric motors or fluid actuators can be utilized to modify the shape of several of the components of the seat for occupant comfort.

According to alternative embodiments, the elements of the seat and the upper back support may be given other configurations that inter-relate or function according to the claimed invention. Accordingly, all such modifications are intended to be included within the scope of the invention as defined in the following claims. In the claims, each means-plus-function clause is intended to cover the structures described herein as performing the recited function and not only structurally equivalents but also equivalent structures.

Other substitutions, modifications, changes and omissions may be made in the design, operating conditions and arrangement of the exemplary embodiments without departing from the spirit of the invention as expressed in the appended claims.

What is claimed is:

1. A seat comprising:
   a base assembly including a seat-support;
   a seat member supported on the base assembly;
   a back frame pivoted to the base assembly for movement;
   a back shell connected to the back frame; and,
   an upper back support, the upper back support comprising:
      a panel having a lower portion and an upper portion, with the lower portion flexibly coupled to the back shell of the seat; and,
      a resilient member coupled to the panel proximate the upper portion and to the back shell of the seat.

2. The seat of claim 1, including at least an additional resilient member coupled to the panel proximate the upper portion and to the back shell of the seat and in a space apart relationship to the other resilient member.

3. The seat of claim 2, wherein the resilient members are composed of one of a foam, rubber and plastic.

4. The seat of claim 1, wherein one of a hinge and an adhesive flexibly couples the panel to the back shell of the chair.

5. The seat of claim 1, including a head rest coupled to the upper portion of the panel, and a support frame assembly coupled to the back frame of the seat and abutting the headrest.

6. The seat of claim 1, wherein the seat is a vehicle seat.

7. An upper back support in a vehicle seat having a base assembly including a seat-support, a seat member supported on the base assembly, a back frame pivoted to the base assembly for movement and a back shell connected to the back frame, the upper back support comprising:
   a panel having a lower portion and an upper portion, with the lower portion flexibly coupled to the back shell of the vehicle seat; and,
   a resilient member coupled to the panel proximate the upper portion and to the back shell of the vehicle seat.

8. The upper back support of claim 7, including at least an additional resilient member coupled to the panel proximate the upper portion and to the back shell of the vehicle seat and in a space apart relationship to the other resilient member.

9. The upper back support of claim 8, wherein the resilient members are composed of one of a foam, rubber and plastic.

10. The upper back support of claim 7, wherein one of a hinge and an adhesive flexibly couples the panel to the back shell of the vehicle seat.

11. The upper back support of claim 7, including a head rest coupled to the upper portion of the panel, and a support frame assembly coupled to the back frame of the vehicle seat and abutting the headrest.

12. An upper back support for an occupant of a seat, with the seat having a base assembly including a seat-support, a seat member supported on the base assembly, a back frame pivoted to the base assembly for movement and a back shell connected to the back frame, the upper back support comprising:
   a means for supporting having a lower portion and an upper portion;
   a means for coupling attached to the lower portion of the means for supporting and attached to the back shell of the seat; and,
   a means for biasing coupled to the means for supporting proximate the upper portion and to the back shell of the seat.

13. The upper back support of claim 12, including at least an additional means for biasing coupled to the means for supporting proximate the upper portion and to the back shell of the vehicle seat and in a space apart relationship to the other means for biasing.

14. The upper back support of claim 13, wherein the means for biasing are composed of one of a foam, rubber and plastic.

15. The upper back support of claim 12, wherein the means for coupling is one of a hinge and an adhesive.

16. The upper back support of claim 11, including a means for resting the head of the occupant coupled to the upper portion of the means for supporting, and a means for holding coupled to the back frame of the vehicle seat and abutting the means for resting the head.

17. A method of assembly of a seat having an upper back support, the seat having a base assembly including a seat-support, a seat member supported on the base assembly, a back frame pivoted to the base assembly for movement, a back shell connected to the back frame, and an upper back support flexibly coupled to the back shell, the method comprising the steps of:

provyding a panel having a lower portion and an upper portion;

providing a flexible coupler having a first end and a second end;

attaching the first end of the flexible coupler to the lower portion of the panel;

attaching the second end of the flexible coupler to the back shell;

providing a resilient member having a first end and a second end;

inserting the resilient member between the panel and the back shell;

attaching the first end of the resilient member to the panel, proximate the upper portion of the panel; and, attaching the second end of the resilient member to the back shell.

18. The method of claim 17, including the steps of:

providing a second resilient member having a first end and a second end;

inserting the second resilient member between the panel and the back shell in a spaced apart relationship from the other resilient member;

attaching the first end of the second resilient member to the panel, proximate the upper portion of the panel; and, attaching the second end of the second resilient member to the back shell.

19. The method of claim 17, including the step of selecting the flexible coupler from one of a plastic hinge and an adhesive backed tape.

20. The method of claim 17, including the steps of:

providing a head rest;

attaching the head rest to the panel;

providing a support frame assembly; and, attaching the support frame assembly to the back frame of the vehicle seat and aligning the assembly with the head rest.

* * * * *